Patented Jan. 13, 1925.

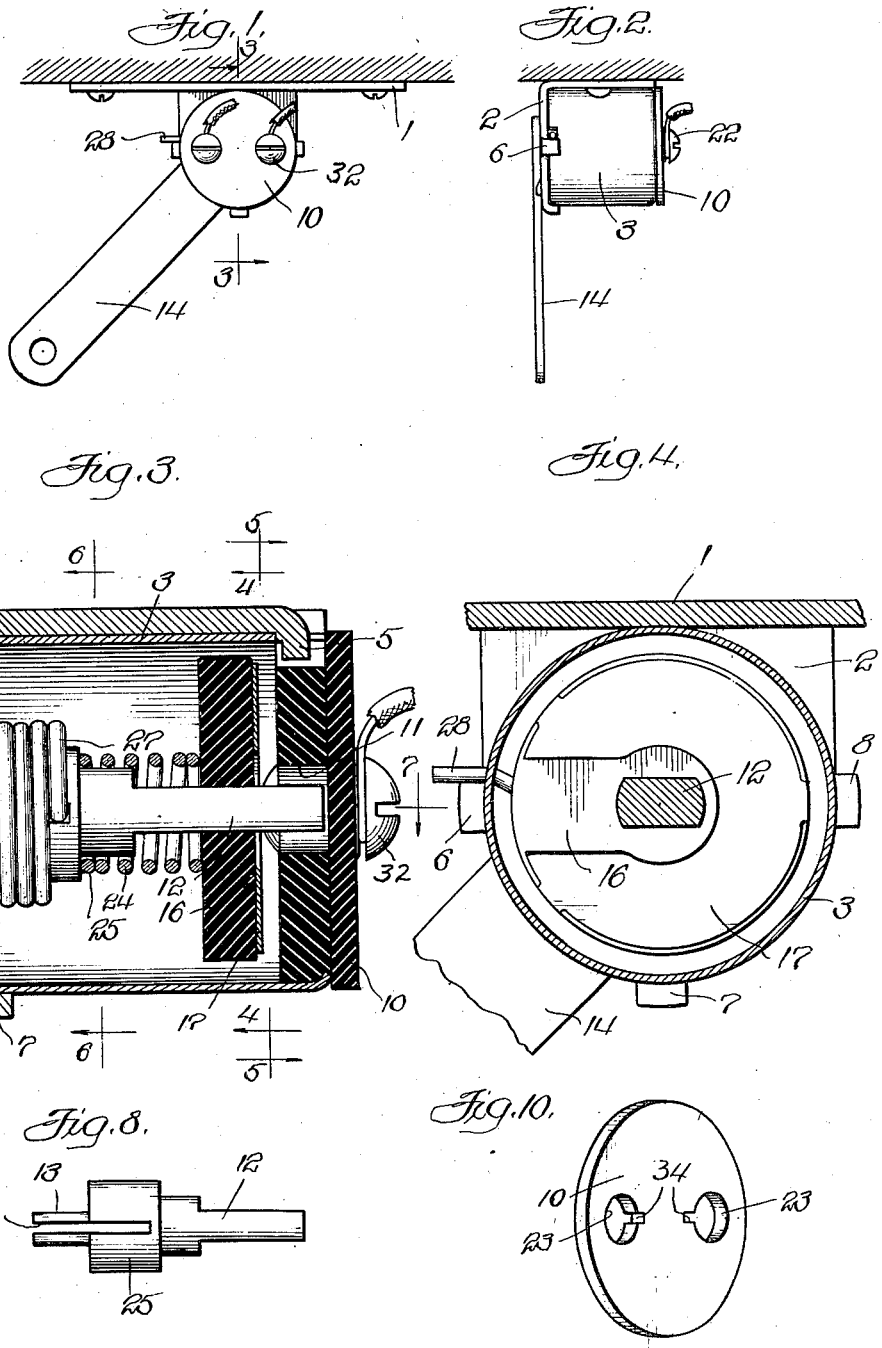

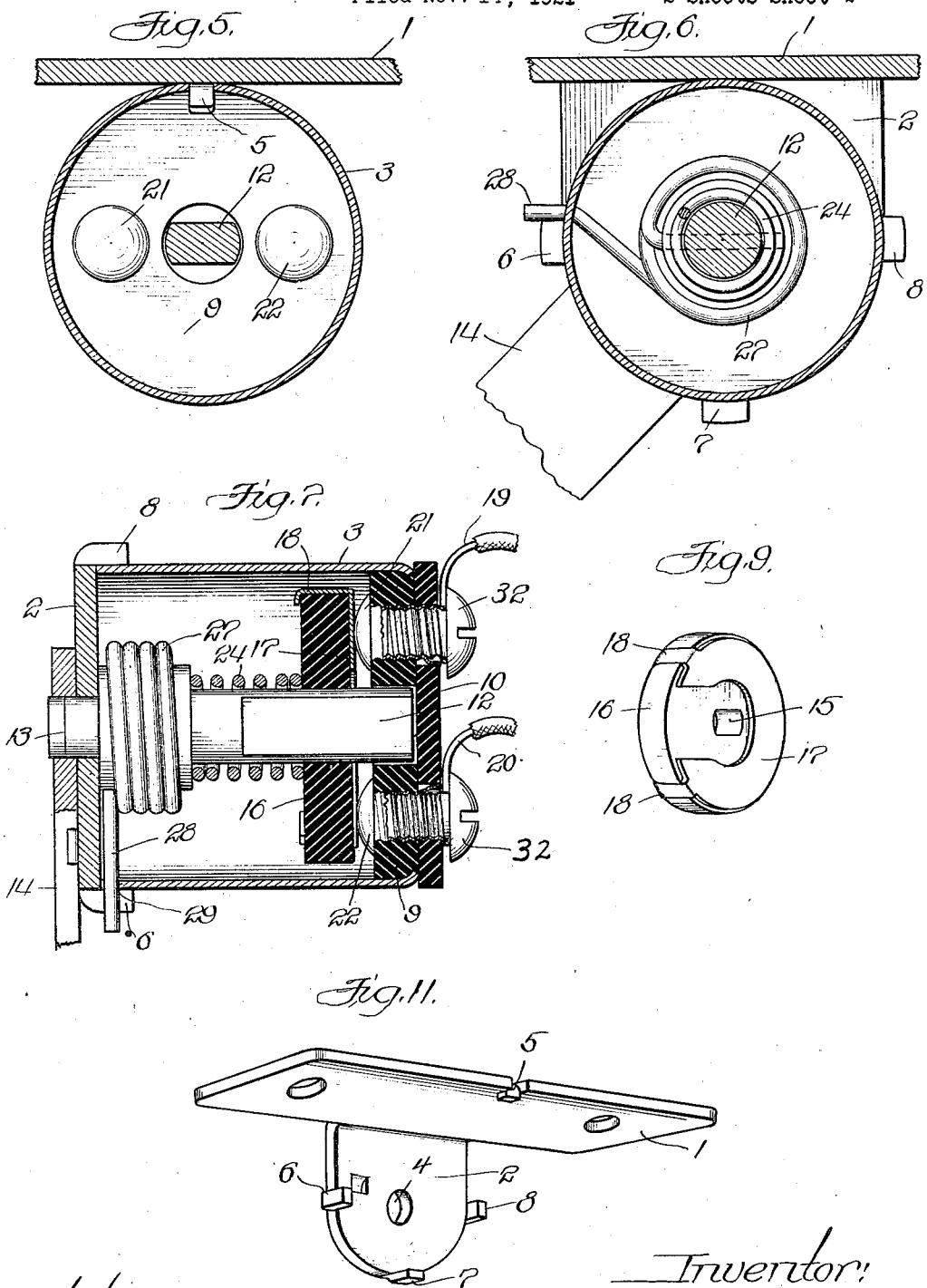

1,523,128

UNITED STATES PATENT OFFICE.

THOMAS J. KERWIN, OF CHICAGO, ILLINOIS, ASSIGNOR TO EDMUNDS & JONES CORPORATION, A CORPORATION OF NEW YORK.

SWITCH FOR VEHICLE LAMPS.

Application filed November 14, 1921. Serial No. 515,166.

*To all whom it may concern:*

Be it known that I, THOMAS J. KERWIN, a citizen of the United States, residing at Chicago, in the county of Cook and State of Illinois, have invented certain new and useful Improvements in Switches for Vehicle Lamps; and I do hereby declare the following to be a full, clear, and exact description of the invention, such as will enable others skilled in the art to which it appertains to make and use the same.

My invention relates to electric switches and in some of its general objects aims to provide a switch construction in which most of the parts, including the insulating portions, can be manufactured and assembled by cheap punch press operations. In another general aspect it aims to provide a spring-retracted switch which will normally be in its "off" position but which will be in its "on" position during a wide range of movement so as to adjust itself automatically to wide variations in the operative connnections or in the movement of the member by which the switch is indirectly actuated.

In one of its immediate commercial applications, the switch of my invention is particularly adapted for use in controlling the circuit connections to a signal lamp disposed at the rear of an automobile and for connection to some portion of the brake-setting mechanism of the automobile, so that the applying of the brake will automatically close the circuit to this lamp, thereby signaling a driver in the rear of the automobile to stop or at least slacken his speed. Owing to the irregular extent to which the brake lever may be moved at different times, the extent of movement imparted to any switch lever connected to the brake lever or to the brake rod will vary correspondingly, but it is important that this circuit should be closed as soon as the brake lever is moved appreciably out of its brake-releasing position and that the circuit should be kept closed until the brake lever is returned to its "off" position. It is also highly desirable that a switch for this purpose should be simple and cheap in construction, should require a minimum of rivets or other fastening elements for assembling the same, and should be so arranged that it can easily and quickly be fastened to a conveniently located portion of the automobile. It is likewise important that the electrical connection made while the circuit is closed should be positive and should keep itself clean and that the effectivness of this electrical connection should not depend on any exactness of adjustment of the parts such as would require slow and high priced labor. My invention aims to provide a switch construction meeting all of these requirements.

In a more particular aspect, my invention aims to provide novel means for supporting the operating shaft of a switch and for connecting it both to an actuating lever and to a retracting spring. It also aims to provide a novel and inexpensive construction of an insulating head for the casing of such a switch, together with a novel mounting of the conducting member which effects the switching; and it also aims to provide novel and inexpensive means for preventing relative rotation of the various parts of the casing with respect to each other and with respect to the supporting element, and novel means for latching the retracting spring against the unwinding. Still further and more detailed objects will appear from the following specification and from the accompanying drawings, in which—

Fig. 1 is an elevation of a switch embodying my invention, showing the same as fastened under the floor of an automobile.

Fig. 2 is a side elevation of the same switch, taken from the left hand side of Fig. 1.

Fig. 3 is an enlarged vertical section taken through Fig. 1 along the axis of the switch.

Figs. 4, 5 and 6 are transverse sections taken along the correspondingly numbered lines in Fig. 3.

Fig. 7 is a horizontal and longitudinal section similar to Figs. 3 to 6 inclusive and taken along the axis of Fig. 3.

Fig. 8 is an elevation of the rock shaft of the switch, drawn on a smaller scale than Fig. 3.

Fig. 9 is a corresponding perspective view of the circuit-controlling contact member and the insulating disk carrying the same.

Fig. 10 is a perspective view of the outer disk which forms the overhanging portion of the insulated head at the contact-carrying end of the switch casing.

Fig. 11 is a perspective view of the supporting member of the switch showing the lugs which anchor the casing in position and one of which also latches the retracting spring against unwinding, and also showing the stop which limits the retraction of the actuating lever of the switch.

In constructing a switch after the manner of the illustrated embodiment, I preferably employ a supporting member formed from sheet metal and comprising in integral formation a base plate 1 and an end plate 2 extending at right angles to the base plate, the base plate desirably having screw holes for facilitating its attachment to a convenient support. The end plate 2 is equipped with suitable formations for engaging the exterior of a substantial cylindrical metal shell 3, which formations are there shown as three lugs 6, 7 and 8 cooperating with the base 1 in preventing the shell 3 from moving laterally with respect to the face of the end plate 2, thereby holding the shell properly centered with respect to a correspondingly located perforation 4 in the end plate. The base plate 1 also has a lug 5 extending from it in the same general direction as the aforesaid lugs 6, 7 and 8, and this forward lug 5 is hooked over an indented end portion of the shell 3 in assembling the parts, so as to anchor the shell against sliding out of its normal position or moving to the right in Fig. 3.

With the shell thus disposed, its rear end is closed against the entrance of dust or mud by the end plate 2. Then its forward end is closed by an insulating head which desirably consists of a portion 9 disposed entirely within the casing 3 and an adjacent portion 10 of a sufficiently larger diameter to overhang the forward end of the shell 3. The parts 9 and 10 while desirably made of separate pieces to cheapen the cost of manufacture, cooperate in forming a unitary insulating head for the casing and this head has a bore 11 extending part way through the same from the interior of the switch casing and disposed in axial alinement with the bore 4 in the end plate 2 of the supporting member.

Rotatably mounted within the casing and extending along the said axis is a rock shaft 12 which desirably has a forked rear end 13 extending through the bore 4 and interlocked with the actuating lever 14 of the switch, this shaft having its other end socketed in the said bore 11 in the insulating head of the switch casing. The said socketed end of the rock shaft 12 is desirably milled down to an angular section as shown in Figs. 3 and 4 and slidably fits the correspondingly sectioned bore 15 of an insulating disk 16 which carries a metal contact member 17. This contact member 17 desirably has a flat main portion substantially of a horseshoe or U shape, and has fingers 18 extending at right angles to this main portion and clinched over the periphery of the insulating disk 16 so as to anchor this contact member rigidly to the said disk.

To cooperate with this contact member, I mount upon the insulating head of the switch casing a pair of circuit terminals connected respectively to wires 19 and 20 which form part of the electric circuit. For this purpose, I desirably provide a pair of tubular rivets 21 and 22 each of which extends entirely through the insulating head and each of which is threaded for receiving one of the screws 32 which respectively anchor the said wires 19 and 20. To prevent a rotation of the threaded shanks of the contact members 21 and 22 while the screws 32 are being tightened, I desirably equip the enlarged outer disk portion 10 of the insulating head not only with a pair of bores 23 alining with corresponding bores in the inner head portion 9, but also with recesses 34 forming lateral enlargements for the said bores 23. Then I indent a corresponding edge portion of the threaded tubular shank of each of the contact members 21 and 22 into the adjacent recess 34 while also slightly expanding the outer end of the said tubular portion, thereby clinchingly securing the head portions 9 and 10 to each other and also locking the contact members 21 and 22 against rotation.

While the insulating disk 16 which carries the horseshoe-shaped contact plate 17 is freely slidable longitudinally of the rock shaft 12, it is continuously urged forwardly of that shaft or towards the insulating head of the switch casing by a spiral spring 24 which desirably is interposed between the disk 16 and the forward end of an enlargement 25 on the rock shaft after the manner shown in Figs. 3 and 7. This rock shaft has a longitudinal slot 26 extending into it from its rear end so as to space two prongs 13 from each other, and this slot 26 desirably extends also into the enlargement 25 so as to receive the forward end of a coiled spring 27 which serves for normally retracting the rock shaft. The retracting spring 27 has its free end 28 extending through a lateral notch at the rear end of the casing and engaging the stop lug 6 on the supporting member, whereby this stop prevents the spring from unwinding after it is initially tensioned and whereby the close approaching of the wire end 28 to the walls of the said notch 29 in the shell prevents the shell from rotating about the axis of the rock shaft. Consequently, with the angularly sectioned slot 15 in the disk 16 in a predetermined position and with the head of the casing assembled so that the contact members 21 and 22 are in predetermined positions, I can readily cause the gap in the contact plate 17 to aline with one of the said contacts when the rock shaft is in its normal or retracted position. However, a relatively short rotational movement of the rock shaft will carry the contact plate 17 into engagement with the contact member which is normally opposite the said gap, while continuously leaving the other contact member in engagement with the contact plate 17 as shown in Fig. 7. The circuit will therefore be closed between the two contact members, and owing to the relatively large circumferential extension of the arcuate contact plate 17, this closing of the circuit will continue through a wide range of rotational movements of the rock shaft.

To effect this rotational movement I provide the actuating lever 14 initially with a bore of angular section through which the two prongs may slightly project when the switch is being assembled, and I then compress the prongs 13 longitudinally of the rock shaft somewhat after the manner shown in Fig. 3 so as to anchor them in the said angular bore of the lever 14.

With the parts thus arranged, it will readily be seen from the drawings that the actuating lever, the supporting member, the rotatably mounted contact member, the insulating disk carrying the latter, and the two insulating head portions 9 and 10 can all be made by punch press operations. Also, that a considerable share of the assembling can be done by punch press operations, thereby expediting the rate of manufacture and cheapening the production. It will likewise be noted that by using a retracting spring having its ends disposed at predetermined angles, and by employing a stationary finger or lug as the stop for the outer end of this spring, I can insure the " off " positioning of the switching or movable contact member when the switch is inoperative; also, that the same spring end by projecting through a notch in the casing cooperates with the overhanging finger 6 in anchoring the spring against rotation.

However, while I have illustrated and described my invention as embodied in a switch particularly adapted for use in connection with vehicle signals and have disclosed the same as including a number of desirable details, I do not wish to be limited to the particular use thus mentioned or to the details of construction and arrangement thus disclosed. Obviously, various additions, omissions or other changes might be made without departing from the spirit of my invention or from the appended claims.

I claim as my invention:

1. An electric switch casing embodying a supporting member having a supporting flange and a head flange at right angles thereto, the head flange having a perforation; a shell coaxial with the perforation, fingers on the head flange for preventing lateral displacement of the shell, and a finger on the supporting flange for holding the shell in engaging relation to the fingers on the head flange.

2. An electric switch casing embodying a supporting member having a supporting flange and a head flange at right angles thereto, the head flange having a perforation; a shell coaxial with the perforation, fingers on the head flange for preventing lateral displacement of the shell, and a finger on the supporting flange for holding the shell in engaging relation to the fingers on the head flange, the finger on the supporting flange being bent into tight gripping relation to the shell.

3. An electric switch casing embodying a supporting member having a supporting flange and a head flange at right angles thereto, the head flange having a perforation; a shell coaxial with the perforation, fingers on the head flange for preventing lateral displacement of the shell, and a finger on the supporting flange indenting the adjacent end of the shell and tightly gripping the shell to hold it close to the supporting flange and to maintain the other end of the shell in engaging relation to the fingers on the head flange.

4. An electric switch embodying a supporting member having a supporting flange and a head flange at right angles thereto, the head flange having a perforation; a shell abutting at one end against the head flange, the two flanges having integral formations cooperating hold the shell in fixed position; a head mounted on the other end of the shell and having a bore coaxial with the perforation in the head flange, and switching means housed by the shell and including a rock shaft journaled in both the said perforation and bore.

5. In an electric switch, a stationary shell having a lateral aperture, switching means housed by the shell and including a rock shaft having a transverse perforation, a retracting spring coiled about the rock shaft and having its ends extending respectively through the said aperture and perforation, and a supporting member fast on the shell and having an integral stop disposed adjacent to the aperture in the shell and engaging the end of the spring which projects through the aperture.

6. In an electric switch, a stationary shell, switching means housed by the shell and including a rock shaft having a longitudinal slot extending into the same from one end thereof, a supporting member fast upon the shell and having a perforation through which the slotted end of the shaft rotatably extends, and an actuating lever disposed back of the supporting member and having an angular perforation into which the slotted shaft end also extends and into which the said end is expanded to secure the lever to the shaft.

7. An electric switch embodying a casing having a pair of relatively insulated circuit terminals extending into the same from one end of the casing, a rock shaft extending into the casing from the other end thereof, an insulator slidable upon the shaft but interlocked therewith against relative rotation, an arcuate contact plate fast on the insulator and adapted to contact with both circuit terminals through a considerable part of the rotational movement of the insulator, and yielding means continuously urging the insulator longitudinally of the shaft to press the contact plate against the circuit terminals.

8. An electric switch as per claim 7, in which the shaft has a shoulder formation and in which the yielding means comprise a compression spring interposed between the shoulder formation and the insulator.

9. An electric switch embodying an insulating base having a perforation enlarged at one edge to form a recess, and a switch terminal comprising a stud having its shank housed by the perforation and having at one end a head projecting beyond one face of the insulating base, the other end of the shank being expanded into the said recess to anchor the stud to the base.

10. An electric switch embodying an insulator base having a perforation enlarged at one edge to form a recess, and a switch terminal having a shank housed by the perforation and having at one end a head projecting beyond one face of the insulating base, the other end of the shank being threaded to receive a wire clamping screw, the shank having a portion thereof radially outward of the thread expanded into the said recess to anchor the stud nonrotatably to the base.

11. An electric switch embodying a supporting element having a perforation therein, a shaft having a longitudinally slotted end portion extending through the perforation and having a shoulder engaging one face of the supporting element, and a lever bearing against the opposite face of the supporting element and having an angularly contoured perforation through which the slotted end of the shaft extends, the tips of the said ends being expanded to interlock the same with the lever.

12. An electric switch embodying a casing, an insulating head for one end of the casing having a bore extending part way through the same from the interior of the casing, and switching means within the casing including a shaft having one end journaled in the said bore and including a pair of circuit terminals extending through the insulating head; the said head comprising an insulated disk fitting the bore of the casing and perforated to afford the first named bore and anchored to the casing, and a second insulating disk disposed outside the end of the casing and overhanging the said end and secured to the first named insulator by the said circuit terminals.

Signed at Chicago, Illinois, Nov. 11th, 1921.

THOMAS J. KERWIN.